(12) United States Patent  (10) Patent No.: US 8,222,358 B2
Rodriguez et al.  (45) Date of Patent: Jul. 17, 2012

(54) PROCESS FOR PRODUCING PROPYLENE COPOLYMERS (75) Inventors: George Rodriguez, Houston, TX (US); Bruce Allan Harrington, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 878 days.

(21) Appl. No.: 11/698,825

(22) Filed: Jan. 26, 2007

(65) Prior Publication Data

US 2007/0208148 A1 Sep. 6, 2007

Related U.S. Application Data (60) Provisional application No. 60/778,241, filed on Mar. 2, 2006.

(51) Int. Cl.
*C08F 4/6592* (2006.01)
*C08F 4/643* (2006.01)
*B01J 31/22* (2006.01)

(52) U.S. Cl. ........ 526/134; 526/133; 526/160; 526/170; 526/348; 526/943; 502/103; 502/152

(58) Field of Classification Search .................. 526/133, 526/134, 160, 170, 172, 348, 943; 502/103, 502/152
See application file for complete search history.

(56) References Cited

U.S. PATENT DOCUMENTS

| | | | |
|---|---|---|---|
| 6,486,088 B1 | 11/2002 | Crowther et al. | 502/103 |
| 6,559,253 B2 | 5/2003 | Crowther et al. | 526/160 |
| 6,635,597 B1 | 10/2003 | Marks et al. | 502/202 |
| 2004/0236042 A1* | 11/2004 | Datta et al. | 526/126 |

FOREIGN PATENT DOCUMENTS

| | | |
|---|---|---|
| WO | WO 97/19959 | 6/1997 |
| WO | WO 99/06412 | 2/1999 |
| WO | WO 99/45040 | 9/1999 |
| WO | WO99/45042 | 9/1999 |
| WO | 01/29096 | 4/2001 |
| WO | WO 02/24793 | 3/2002 |

OTHER PUBLICATIONS

Eugene You-Xian Chen et al. in *Chem. Rev.* 2000, 100, entitled "Cocatalysts for Metal-Catalyzed Olefin Polymerization: Activators, Activation Processes, and Structure—Activity Relationships", pp. 1391-1434.

Crowther et al., entitled "Hafnocenes in the High Temperature Solution Process", ExxonMobil Company Report PLT.17CP.98, Oct. 1998.

* cited by examiner

*Primary Examiner* — Caixia Lu
(74) *Attorney, Agent, or Firm* — Stephen Timmins; Kevin M. Faulkner; Hsin Lin

(57) ABSTRACT

In a process for producing a propylene copolymer, propylene and at least one olefin monomer selected from ethylene and alpha olefins having 4 to 20 carbon atoms are contacted with a catalyst system comprising (a) a catalyst precursor comprising an organometallic compound and (b) an activator comprising a fluoroarylborate anion represented by the formula:

$$Ct^+[B(Ar)_x(R)_n]^-$$

where $Ct^+$ is a cation capable of extracting an alkyl group from, or breaking a carbon-metal bond of, the organometallic compound; Ar is a fluorophenyl group; R is a fluoronaphthyl group and each of x and n is 1, 2, or 3, with the proviso that the sum of $x+n=4$.

13 Claims, 2 Drawing Sheets

Fig. 1
Molecular Weight of Propylene-Ethylene Copolymer Products When the Metallocene is Activated with a Series of Borate Activators. Examples 4-7. Mw Value Extrapolated to Constant 70% Ethylene Conversion.

Fig. 2
Catalyst Activity of Propylene-Ethylene Copolymer Polymerizations When the Metallocene is Activated with a Series of Borate Activators. Examples 4-7. Activity Value Reported is the Average of X number of Runs.

Fig. 3

Molecular Weight of Propylene-Ethylene Copolymer Products When the Metallocene is Activated with a Series of Borate Activators. Examples 8-17. Average of Four Repeat Runs With Calculated Confidence Limits.

PROCESS FOR PRODUCING PROPYLENE COPOLYMERS

CROSS REFERENCE TO RELATED APPLICATION

This application claims the benefit of Provisional Application No. 60/778,241 filed Mar. 2, 2006, the disclosure of which is incorporated by reference.

FIELD

This invention relates to a process for producing copolymers of propylene with other alpha-olefins, and in particular, with ethylene using organometallic catalyst systems activated with fluoroarylborate activators.

BACKGROUND

Copolymers of propylene with other alpha-olefins, such as ethylene, are well-known and have a wide variety of commercial applications, either alone or when blended with other polymers. Typically such propylene copolymers are produced by a single or multi-stage polymerization process using a catalyst including an activator or co-catalyst that operates in conjunction with a catalyst precursor in the formation of a transition metal complex. This applies to conventional Ziegler Natta type catalyst systems, such as those employing titanium chloride based transition metal catalysts, as well as to the more recently developed single site based catalyst systems, such as those employing complexes with cyclopentadienyl or hetero-atom containing ancillary ligand systems. An activator may also affect the molecular weight, degree of branching, comonomer content and other properties of the resultant copolymer. Typical activators include, for example, alumoxanes, aluminum alkyls and non- or weakly coordinating ionizing anions.

One known class of ionizing activator used in the production of propylene copolymers is fluorophenylborates and, in particular, perfluorophenylborates, the use of which is reviewed by Eugene at al. in *Chem. Rev.* 2000, 100, page 1391. Tetrakis(perfluoronaphthyl)borates have been shown to activate metallocene catalysts in a similar manner to their perfluorophenyl counterparts but yield copolymers with higher molecular weight under similar conditions using the same metallocene, the same reaction temperature, and the same conversion. However, tetrakis(perfluoronaphthyl)borates are harder to make and have higher raw material costs than the perfluorophenyl compounds. It would therefore be desirable to find an activator that has equivalent or better activity and molecular weight capabilities than tetrakis(perfluoronaphthyl)borate but is simpler and less expensive to produce.

According to the invention, it has now been found that certain mixed fluorophenyl/fluoronaphthylborates are effective activators for use with organometallic catalyst precursors in the polymerization of olefins, particularly of propylene with ethylene and higher alpha-olefins and can produce copolymers with molecular weights approaching those obtained with tetrakis(perfluoronaphthyl)borate activators.

U.S. Pat. No. 6,486,088 describes catalyst activators for asymmetrically bridged hafnocene catalyst precursors and use of the resultant catalysts in olefin polymerization, particularly the production of ethylene copolymers. The activators comprise a stable carbenium ion and a compatible non-coordinating anion, such as a halogenated tetraphenyl or tetranaphthyl boron compound. Suitable activators are said to include tropillium tetrakis(perfluoronapthyl) or tetrakis(perfluoro-4-biphenyl)borate, triphenylmethylium tetrakis(perfluoronapthyl) or tetrakis(perfluoro-4-biphenyl)borate, benzene(diazonium)tetrakis(perfluoronapthyl) or tetrakis (perfluoro-4-biphenyl)borate, tropillium tetrakis (perfluoronapthyl) or tetrakis(perfluoro-4-biphenyl)borate, triphenylnethylium tetrakis(perfluoronapthyl) or tetrakis (perfluoro-4-biphenyl)borate, benzene(diazonium)tetrakis (perfluoronapthyl) or tetrakis(perfluoro-4-biphenyl)orate, tropillium tetrakis(perfluoronapthyl) or tetrakis(perfluoro-4-biphenyl)borate, triphenylmethylium tetrakis(perfluoronapthyl) or tetrakis(perfluoro-4-biphenyl)borate, and benzene(diazonium) tetrakis(perfluoronapthyl) or tetrakis (perfluoro-4-biphenyl)borate. Anions with mixed ligands, such as tris(perfluorophenyl)(perfluoronapthyl)borate, are also said to be suitable, but no directions are provided as to how to synthesize such materials.

U.S. Pat. No. 6,559,253 describes a polymerization process for producing ethylene copolymers having a density of about 0.87 to about 0.930 comprising contacting, under homogeneous polymerization conditions at a reaction temperature of 140° C. to 220° C., ethylene and one or more comonomers capable of insertion polymerization with a catalyst complex derived from a bridged biscyclopentadienyl hafnium organometallic compound and an activating cocatalyst comprising a halogenated tetraaryl-substituted Group 13 anion wherein each aryl substituent contains at least two cyclic aromatic rings. Preferred anions are tetrakis(perfluoronapthyl)borates and tetrakis(perfluoro-4-biphenyl)borates. However, anions with mixed ligands, such as tris(perfluorophenyl)(perfluoroanthracyl)borate, are also referred to as being suitable, although again the reference is silent as to how to synthesize these mixed ligand anions.

U.S. Pat. No. 6,635,597 describes a catalyst activator adapted for use in the activation of metal complexes of metals of Group 3-10 for polymerization of ethylenically unsaturated polymerizable monomers, especially ethylene and propylene, comprising a neutral (Lewis acid) or charge separated (cation/anion pair) compound of the formula:

wherein B is boron; $R^1$ independently each occurrence is a monovalent, anionic ligand group, with the proviso that for cationic compounds, one $R^1$ additionally comprises a dissociated cation moiety; $Ar^f$ independently each occurrence is a monovalent, fluorinated organic group containing from 10 to 100 non-hydrogen atoms, r is 0, 1, 2 or 3, and m is 1, 2 or 3; with the proviso that the sum of r and m is 3 or 4, and if r+m=3, then B is neutral and if r+m=4, then B is negatively charged, said charge being balanced by a cation component of one $R^1$. Preferred and claimed examples of charge separated catalyst activators are said to include $L^+B^-(C_6F_5)_3(C_{10}F_7)$, $L^+B^-(C_6F_5)_2(C_{10}F_7)_2$, $L^+B^-(C_6F_5)_1(C_{10}F_7)_3$, and $L^{30}B^-(C_{10}C_7)_4$, wherein $L^+$ is a cation of a Bronsted acid, ferrocenium, a carbonium cation, a silylium cation, $Ag^+$, or the cationic derivative of a Group 3-10 metal complex catalyst. However, the reference fails to provide any information as to how to synthesize the mixed perfluorophenyl/perfluoronaphthyl compounds, with the only synthesis Examples being directed to the production of tris(β-perfluoronaphthyl)methyl boranes.

SUMMARY

In one aspect, the invention resides in a process for producing a propylene copolymer comprising contacting propylene and at least one olefin monomer selected from ethylene and alpha olefins having 4 to 20 carbon atoms with a catalyst system comprising (a) a catalyst precursor comprising an organometallic compound and (b) an activator comprising a fluoroarylborate anion represented by the formula:

$$Ct^+[B(Ar)_x(R)_n]^-$$

where $Ct^+$ is a cation capable of extracting an alkyl group from, or breaking a carbon-metal bond of, the organometallic compound; Ar is a fluorophenyl group; R is a fluoronaphthyl group and each of x and n is 1, 2, or 3, with the proviso that the sum of x+n=4.

Conveniently, Ar is a perfluorophenyl and R is a perfluoronaphthyl.

Conveniently, $Ct^+$ is selected from silylium, trityl carbenium, Group-12 metal, anilinium, ammonium, phosphonium, and arsonium cations, and anilinium, ammonium, phosphonium, and arsonium cationic derivatives wherein the cationic derivatives contain $C_1$ to $C_8$ hydrocarbyl, hydrocarbylsilyl, or hydrocarbyl-amine substituents for one or more cation hydrogen atoms.

Preferably, said at least one olefin monomer is ethylene and said propylene copolymer contains units derived from propylene in an amount greater than or equal to 65 weight percent, and units derived from ethylene in an amount of from 5 to 35 weight percent.

Conveniently, said catalyst precursor is selected from a metallocene catalyst precursor, a bisamide catalyst precursor, an amine bisamide catalyst precursor, or a pyridine bisamide catalyst precursor.

Preferably, said catalyst system is capable of producing stereoregular polypropylene, and more preferably, either isotactic polypropylene or syndiotactic polypropylene.

DETAILED DESCRIPTION

For the purposes of this invention and the claims thereto, when a polymer is referred to as comprising a monomer, the monomer present in the polymer is the polymerized form of the monomer. Likewise when catalyst components are described as comprising neutral stable forms of the components, it is well understood by one of ordinary skill in the art, that the active form of the component is the form that reacts with the monomers to produce polymers. In addition, a reactor is any container(s) in which a chemical reaction occurs.

For the purposes of this invention and the claims thereto, the new numbering scheme for the Periodic Table Groups is used as described in CHEMICAL AND ENGINEERING NEWS, 63(5), 27 (1985).

As used herein, the term "copolymer" is intended to include any polymer having two or more monomers, whereas the term "polymer" is meant to encompass homopolymers and copolymers.

The term "catalyst system" is defined to mean a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety.

The term "catalyst precursor" is also often referred to as precatalyst, catalyst, catalyst precursor, catalyst compound, transition metal compound, metallocene complex, and/or transition metal complex. These words are used interchangeably. Activator and cocatalyst are also used interchangeably. A scavenger is a compound that is typically added to facilitate oligomerization or polymerization by scavenging impurities that might inhibit polymerization, such as polar impurities present in the monomer feed or produced in the course of polymerization. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound. The transition metal compound may be neutral as in a precatalyst, or a charged species with a counterion as in an activated catalyst system.

For purposes of this disclosure, the term "fluorophenyl group" means a phenyl group in which at least one hydrogen atom has been replaced by fluorine and is intended to include phenyl compounds in which other hydrogen atoms on the aromatic ring have been replaced by other substituents, such as a hydrocarbyl substituent. The term "perfluorophenyl group" means that each phenyl hydrogen atom has been replaced by a fluorine atom except, of course, for the hydrogen atom that has been replaced by the B atom.

Similarly, the term "fluoronaphthyl group" means a naphthyl group in which at least one hydrogen atom has been replaced by fluorine and is intended to include naphthyl compounds in which other hydrogen atoms on the aromatic ring have been replaced by other substituents, such as a hydrocarbyl substituent. The term "perfluoronaphthyl group" means that each naphthyl hydrogen atom has been replaced by a fluorine atom, except, of course, for the hydrogen atom that has been replaced by the B atom.

The terms "hydrocarbyl radical", "hydrocarbyl" and "hydrocarbyl group" are defined to include any radical that contains hydrogen and up to 30 carbon atoms and may be linear, branched, or cyclic, and when cyclic, aromatic or non-aromatic, and include a substituted hydrocarbyl radical, as this term is defined below. When referring to a hydrogen substituent, the terms "hydrogen" and "hydrogen radical" are used interchangeably.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N($R^*$)—, =N—, —P($R^*$)—, =P—, —As($R^*$)—, =As—, —Sb($R^*$)—

=Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic ring structure.

Examples of suitable hydrocarbyl radicals include those having from 1 to 30 carbon atoms, such as methyl, ethyl, ethenyl and isomers of propyl, butyl, pentyl, hexyl, heptyl, octyl, propenyl, butenyl, pentenyl, hexenyl, heptenyl, octenyl propynyl, butynyl, pentynyl, hexynyl, heptynyl, octynyl, butadienyl, pentadienyl, hexadienyl, heptadienyl and octadienyl.

Also included are isomers of saturated, partially unsaturated and aromatic cyclic and polycyclic structures wherein the hydrocarbyl radical may additionally be subjected to the types of substitutions described above. Examples include phenyl, methylphenyl, dimethylphenyl, ethylphenyl, benzyl, methylbenzyl, cyclopentyl, cyclopentenyl, cyclohexyl, cyclohexenyl, methylcyclohexyl, cycloheptyl, cycloheptenyl, norbornyl, norbornenyl, adamantyl and the like.

For this disclosure, when a radical is listed, it indicates that radical type and all other radicals formed when that radical type is subjected to the substitutions defined above. Alkyl, alkenyl and alkynyl radicals listed include all isomers including, where appropriate, cyclic isomers. For example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-methyldiphenyl, 3,4-dimethylphenyl, and 3,5-dimethylphenyl.

The term "hydrocarbylsilyl" is used herein to refer to any branched or unbranched, saturated or unsaturated acyclic or acyclic hydrocarbon radical which has 1 to 30 carbon atoms and which has one or more hydrogen atoms replaced by a silicon atom.

The term "hydrocarbyl-amine" is used herein to refer to any branched or unbranched, saturated or unsaturated acyclic or acyclic hydrocarbon radical has one or more hydrogen atoms replaced by an amino group or substituted amino group.

The present invention provides a process for producing copolymers of propylene with ethylene and/or one or more alpha olefins having 4 to 20 carbon atoms using a catalyst system comprising an organometallic catalyst precursor and a fluoroarylborate activator. The process is effective in producing copolymers of high molecular weight, typically in excess of 50,000 daltons or even 100,000 daltons. The resultant copolymers can be blended with other polymers, particularly polypropylene homopolymers, and the copolymers and copolymer blends can be used to produce injection molded articles, fibers, films and non-woven articles.

Monomers in the Copolymer

In addition to propylene, the copolymer produced by the present process contains units derived from ethylene and/or one or more alpha olefins having 4 to 20 carbon atoms, such as 1-butene, 1-hexene, and 1-octene. Preferably, the copolymer contains units derived from propylene and ethylene.

According to one embodiment of the present invention, the copolymer includes from a lower limit of 5% or 6% or 8% or 10% by weight ethylene-derived units to an upper limit of 20% or 25% or 35% by weight ethylene-derived units. These embodiments also will include propylene-derived units present in the copolymer in the range of from a lower limit of 65% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%. Within these ranges, these copolymers are mildly crystalline as measured by differential scanning calorimetry (DSC), and are exceptionally soft, while still retaining substantial tensile strength and elasticity. At ethylene compositions lower than the above limits for the copolymer, such polymers are generally crystalline, similar to crystalline isotactic polypropylene, and while having excellent tensile strength, they do not have the favorable softness and elasticity. At ethylene compositions higher than the above limits for the copolymer component, the copolymer is substantially amorphous. While such a material of higher ethylene composition may be soft, these compositions are weak in tensile strength and poor in elasticity. In summary, such copolymers of embodiments of the invention exhibit the softness, tensile strength and elasticity characteristic of vulcanized rubbers, without vulcanization.

Fluoroarylborate Activator

An important feature of the present process is the activator employed in the olefin polymerization catalyst system. In particular, the activator includes a fluoroarylborate having the formula I:

where Ct$^+$ is a cation capable of extracting an alkyl group from, or breaking a carbon-metal bond of, an organometallic compound; Ar is a fluorophenyl group; x is 1, 2, or 3; R is a fluoronaphthyl group; n is 1, 2, or 3, provided that the sum of x+n=4. Each R group is substantially connected to the boron atom at the 2- or β-position and so representative compounds according to the invention include the anions:

However, R groups connected at the 1 or 3 position are possible and may be present at small concentrations. The presence of these isomers do not detract from the polymerization activity of the activator since these isomers of most likely reactive themselves.

Conveniently, $Ct^+$ is selected from silylium, trityl carbenium, Group-12 metal, anilinium, ammonium, phosphonium, and arsonium cations, and anilinium, ammonium, phosphonium, and arsonium cationic derivatives wherein the cationic derivatives contain $C_1$ to $C_{30}$ hydrocarbyl, hydrocarbylsilyl, or hydrocarbyl-amine substituents for one or more cation hydrogen atoms. For example, suitable cations $Ct^+$ include N,N-dimethylanilinium, N,N-diethylanilinium, and [4-t-butyl-N,N-dimethylanilinium] cations.

Method of Synthesizing the Fluoroarylborate Activator

When x=1 and n=3 in formula I above, the fluoroarylborate of the invention may be prepared by reacting a compound of the formula $BR_3$, such as tris(β-perfluoronaphthyl)borane, with a compound of the formula Ar-MX, where M is a metal, preferably an alkaline earth metal, and X is a reactive anion, preferably a halide. Typically the compound Ar-MX is perfluorophenylmagnesium bromide. The resulting $[M]^+[B(perfluorophenyl)(perfluoronaphthyl)_3]^-$ can be converted to the required activator by standard salt metathesis techniques.

When x=3 and n=1 in formula I above, the fluoroarylborate of the invention may be prepared by reacting a compound of the formula $BAr_3$, such as tris(β-perfluorophenyl)borane, with a compound of the formula Ar-MX, where M is a metal, preferably an alkaline earth metal, and X is a reactive anion, preferably a halide. Typically the compound Ar-MX is perfluoronaphthylmagnesium bromide.

When x=2 and n=2 in formula I above, the fluoroarylborate of the invention may be prepared by reacting a compound of the formula BrR such as 2-bromoperfluoronaphthylene with a Grignard Salt, R*M where the M is a metal, preferably Li or Mg, and R* is an alkyl. Typically the compound R*M is nBuLi. To the resulting mixture a compound of the formula XBAr2 is added, where X is typically a halide and B is Boron. The product is generally isolated by filtration.

Organometallic Catalyst Precursor

Organometallic precursors compounds suitable for use with the fluoroarylborate activator in the process of the invention include the known organometallic, transition metal compounds useful in traditional Ziegler-Natta coordination polymerization, particularly the metallocene compounds known to be useful in coordination polymerization. These will typically include Group 3-10 transition metal compounds wherein at least one metal ligand can be abstracted by the cocatalyst activator, particularly those ligands including hydride, hydrocarbyl, and hydrocarbylsilyl, and lower alkyl-substituted ($C_1$ to $C_{10}$) derivatives thereof. Examples include hydride, methyl, benzyl, dimethyl-butadiene, etc. Ligands capable of being abstracted and transition metal compounds comprising them include those metallocenes described in, for example U.S. Pat. No. 5,198,401 and International Patent Publication No. WO 92/00333. Additionally, where the metal ligands include halogen, amido or alkoxy labile ligands (for example, biscyclopentadienyl zirconium dichloride) which do not allow for ready abstraction with the activating cocatalysts of the invention, they can be converted into suitable ligands via known alkylation reactions with organometallic compounds such as lithium or aluminum hydrides or alkyls, alkylalumoxanes, Grignard reagents, etc. See EP 0 500 944 and EP 0 570 982 for the reaction of organoaluminum compounds with dihalo-substituted metallocene compounds prior to addition of activating anion compounds.

Further description of metallocene compounds which comprise, or can be alkylated to comprise, at least one ligand capable of abstraction to form a catalytically active transition metal cation appear in the patent literature, e.g., EP-A-0 129 368, U.S. Pat. Nos. 4,871,705, 4,937,299, 5,324,800, 5,470, 993, 5,491,246, 5,512,693, EP-A-0 418 044, EP-A-0 591 756 and International Patent Publication Nos. WO 92/00333, WO 94/01471 and WO 97/22635. Generally, such metallocene compounds comprise mono- or biscyclopentadienyl substituted Group 3, 4, 5, or 6 transition metal compounds wherein the ancillary ligands may be themselves substituted with one or more groups and may be bridged to each other, or may be bridged through a heteroatom to the transition metal. Preferably the cyclopentadienyl rings (including substituted cyclopentadienyl-based fused ring systems, such as indenyl, fluorenyl, azulenyl, or substituted analogs of them), when bridged to each other, will be lower alkyl-substituted ($C_1$ to $C_6$) in the 2 position (with or without a similar 4-position substituent in the fused ring systems) and may additionally comprise alkyl, cycloalkyl, aryl, alkylaryl and or arylalkyl substituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be heteroatom containing with 1-5 non-hydrogen/carbon atoms, e.g., N, S, O, P, Ge, B and Si.

Representative metallocene compounds can have the formula:

where, M is a Group 3 to 6 metal; $L^A$ is a substituted or unsubstituted cyclopentadienyl or heterocyclopentadienyl ancillary ligand π-bonded to M; $L^B$ is a member of the class of ancillary ligands defined for $L^A$, or is J, a heteroatom ancillary ligand σ-bonded to M; the $L^A$ and $L^B$ ligands may be covalently bridged together through one or more Group 13 to 16 element-containing linking groups; $L^C_i$ is an optional neutral, non-oxidizing ligand having a dative bond to M (i equals 0 to 3); and, D and E are independently labile ligands, each having a metal-carbon bond to M, optionally bridged to each other or $L^A$ or $L^B$, which bond can be broken for abstraction purposes by a suitable activator and into which a polymerizable monomer or macromonomer can insert for coordination polymerization. Also, the use of hetero-atom containing rings or fused rings, where a non-carbon Group 13, 14, 15 or 16 atom replaces one of the ring carbons is considered for this specification to be within the terms "cyclopentadienyl", "indenyl", and "fluorenyl". See, for example, the International Patent Publication Nos. WO 98/37106 and WO 98/41530. Substituted cyclopentadienyl structures means that one or more hydrogen atoms is replaced with hydrocarbyl, hydrocarbylsilyl, or heteroatom-containing like structures. The hydrocarbyl structures specifically include $C_1$ to $C_{30}$ linear, branched, cyclic alkyl and cycloaromatic fused and pendent rings. These rings may also be substituted with similar structures.

Non-limiting representative metallocene compounds include monocyclopentadienyl compounds such as pentamethylcyclopentadienyltitanium triisopropoxide, pentamethylcyclopentadienyltribenzyl titanium, dimethylsilyltetramethylcyclopentadienyl-tert-butylamido titanium dichloride, pentamethylcyclopentadienyl titanium trimethyl, dimethylsilyltetramethylcyclopentadienyl-tert-butylamido zirconium dimethyl, dimethylsilyltetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1-methyl-3-butylcyclopentadienyl)zirconium dimethyl, pentamethylcyclopentadienyl-cyclopentadienyl zirconium dimethyl, (tetramethylcyclopentadienyl)(n-propylcyclopentadienyl) zirconium dimethyl; bridged biscyclopentadienyl compounds such as dimethylsilylbis(tetrahydroindenyl)zirconium dichloride and silacyclobutyl(tetramethylcyclopentadienyl)(n-propyl-cyclopentadienyl)zirconium dimethyl; bridged bisindenyl compounds such as dimethylsilylbisindenyl zirconium dichloride, dimethylsilylbisindenyl hafnium dimethyl, dimethylsilylbis(2-methylindenyl)hafnium dimethyl, dimethylsilylbis(2-methylindenyl)zirconium dimethyl, dimethylsilylbis(2-methyl-4-phenylindenyl)hafnium dimethyl, dimethylsilylbis(2-methyl-4-phenylindenyl)zirconium dimethyl, dimethylsilylbis(2-methylbenzindenyl)zirconium dichloride, dimethylsilylbis(2-methylbenzindenyl) zirconium dimethyl; and fluorenyl ligand-containing compounds, e.g., diphenylmethyl(fluorenyl)(cyclopentadienyl)zirconium dimethyl and di(para-triethylsilylphenyl)methylene(2,7-ditert-butylfluorenyl)(cyclopentadienyl) hafnium dimethyl; and the additional mono- and biscyclopentadienyl compounds such as those listed and described in U.S. Pat. Nos. 5,017,714 and 5,324,800, International Patent Publication No. WO 92/00333 and EP-A-0 591 756.

Representative traditional Ziegler-Natta transition metal compounds include tetrabenzyl zirconium, tetra bis(trimethylsilylmethyl)zirconium, oxotris(trimethlsilylmethyl)vanadium, tetrabenzyl hafnium, tetrabenzyl titanium, bis(hexamethyldisilazido)dimethyl titanium, tris(trimethylsilylmethyl) niobium dichloride, tris(trimethylsilylmethyl)tantalum dichloride. The important features of such compositions for coordination polymerization are the ligand capable of abstraction and that ligand into which the ethylene(olefinic) group can be inserted. These features enable ligand abstraction from the transition metal compound and the concomitant formation of the ionic catalyst composition.

Additional organometallic transition metal compounds suitable as olefin polymerization catalysts in present process include any of those Groups 3 to 10 metal compounds that can be converted by ligand abstraction or σ-bond scission into a catalytically active cation and stabilized in that active electronic state by a noncoordinating or weakly coordinating anion sufficiently labile to be displaced by an olefinically unsaturated monomer.

Exemplary compounds include those described in International Patent Publications Nos. WO 96/23010 and WO 97/48735 and Gibson et. al., *Chem. Comm.*, pp. 849-850 (1998), which disclose diimine-based ligands for Group 8- to 10 metal compounds shown to be suitable for ionic activation and olefin polymerization. See also WO 97/48735. Transition metal polymerization catalyst systems from Group 5 to 10 metals wherein the active transition metal center is in a high oxidation state and stabilized by low coordination number polyanionic ancillary ligand systems are described in U.S. Pat. Nos. 5,502,124 and 5,504,049. See also the Group 5 organometallic catalyst compounds of U.S. Pat. No. 5,851, 945 and the tridentate ligand containing Group 5 to 10 organometallic catalyst compounds of U.S. Pat. No. 6,294,495. Group 11 catalyst precursor compounds, capable of activation with ionizing cocatalysts, useful for olefins and vinyl group-containing polar monomers are described and exemplified in International Patent Publication No. WO 99/30822.

U.S. Pat. No. 5,318,935 describes bridged and unbridged bisamido transition metal catalyst compounds of Group 4 metals capable of insertion polymerization of α-olefins. Bridged bis(arylamido) Group 4 compounds for olefin polymerization are described by McConville et al in *Organometallics* 1995, 14, 5478-5480. Further work appearing in *Macromolecules* 1996, 29, 5241-5243 describes bridged bis (arylamido) Group 4 compounds that are active catalysts for polymerization of 1-hexene. Additional transition metal compounds suitable in accordance with the invention include those described in International Patent Publication No. WO 96/40805. Cationic Group 3 or Lanthanide metal complexes for coordination polymerization of olefins are disclosed in International Patent Publication No. WO 00/18808. The precursor metal compounds are stabilized by a monoanionic bidentate ancillary ligand and two monoanionic ligands and are capable of activation with the ionic cocatalysts used herein.

Additional description of suitable organometallic or organometalloid catalyst precursor compounds may be found in the literature, any of such will be suitable where comprising, or where capable of alkylation to comprise, ligands capable of ionizing abstraction. See, for instance, V. C. Gibson, et al, "The Search for New-Generation Olefin Polymerization Catalysts: Life Beyond Metallocenes", *Angew. Chem. Int. Ed*, 38, 428-447 (1999).

In general, in the polymerization catalyst system used in the present process, the catalyst precursor and the activator are combined in weight ratios of about 10:1 to about 1:10; such as about 5:1 to about 1:5; for example about 2:1 to about 1:2. Most preferred is a catalyst precursor to activator mole ratio of 1:1. Multiple activators may be used, including mixtures of alumoxanes with the fluoroarylborate activator of the invention. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane.

The total catalyst system will generally additionally comprise one or more organometallic compound scavenging agents. Such compounds are effective for removing polar impurities from the reaction environment and for increasing catalyst activity. Impurities can be inadvertently introduced with any of the polymerization reaction components, particularly with a solvent, monomer and catalyst feed, and adversely affect catalyst activity and stability. The polar impurities, or catalyst poisons, include water, oxygen and metal impurities. Preferably steps are taken to remove impurities from the polymerization feedstocks before their use, but some minor amounts of organometallic scavenger compound will still normally be used in the polymerization process itself.

Typically these scavenger compounds will be Group 13 organometallic compounds, such as those disclosed in U.S. Pat. Nos. 5,153,157 and 5,241,025 and International Patent Publication Nos. WO 91/09882, WO 94/03506, WO 93/14132 and WO 95/07941. Exemplary compounds include triethyl aluminum, triethyl borane, triisobutyl aluminum, methylalumoxane, and isobutyl aluminumoxane. Those compounds having bulky or $C_6$ to $C_{20}$ linear hydrocarbyl substituents covalently bound to the metal or metalloid center are preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum.

The catalyst system of this invention may also include a support material or carrier. For example, a metallocene complex and one or more activators may be deposited on, contacted with, vaporized with, bonded to, or incorporated within, adsorbed or absorbed in, or on, one or more supports or carriers.

The support material may any of the conventional support materials used in polymerization catalyst systems. Preferably the support material is a porous support material, for example, talc, a zeolite, an inorganic oxide and/or an inorganic chloride. Other support materials include resinous support materials such as polystyrene, functionalized or crosslinked organic supports, such as polystyrene divinyl benzene polyolefins or polymeric compounds, clays, or any other organic or inorganic support material and the like, or mixtures thereof.

The preferred support materials are inorganic oxides that include Group 2, 3, 4, 5, 13 or 14 metal oxides. The preferred supports include silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate and the like. Also, combinations of these support materials may be used, for example, silica-chromium, silica-alumina, silica-titania and the like. Additional support materials may include those porous acrylic polymers described in EP 0 767 184 B1. Other support materials include nanocomposites as described in International Patent Publication No. WO 99/47598, aerogels as described in International Patent Publication No. WO 99/48605, spherulites as described in U.S. Pat. No. 5,972,510 and polymeric beads as described in International Patent Publication No. WO 99/50311.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range from about 100 to about 400 m$^2$/g, pore volume from about 0.8 to about 3.0 cc/g and average particle size is from about 5 to about 100 µm. The average pore size of the carrier useful in the invention typically has pore size in the range of from about 10 to about 1000 Å, preferably about 50 to about 500 Å, and most preferably about 75 to about 350 Å.

As is well known in the art, the catalyst components, that is the metallocene complex and the activator, may also be supported together on one inert support, or the components may be independently placed on two inert supports and subsequently mixed. Of the two methods, the former is preferred.

In another embodiment the support may comprise one or more types of support material which may be treated differently. For example one could use two different silicas that had different pore volumes or had been calcined at different temperatures. Likewise one could use a silica that had been treated with a scavenger or other additive and a silica that had not.

Polymerization Process

The present process can be conducted as a solution, bulk, gas or slurry polymerization process or a combination thereof, but preferably is a solution phase or bulk phase polymerization process.

One or more reactors in series or in parallel may be used in the polymerization process. Catalyst component and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, see U.S. Pat. No. 6,399,722 and International Patent Publication No. WO 01/30862. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

Hydrogen can be added to the polymerization to stabilize the process and help control the molecular weight of the product.

Gas Phase Polymerization

Generally, a fluidized gas bed process is used for producing polymers, with a gaseous stream containing one or more monomers being continuously cycled through the fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control.

The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In one embodiment of the slurry process useful in the invention the concentration of predominant monomer in the reactor liquid medium is in the range of from about 1 to about 10 weight percent, preferably from about 2 to about 7 weight percent, more preferably from about 2.5 to about 6 weight percent, most preferably from about 3 to about 6 weight percent.

Another process useful in the invention is where the process, preferably a slurry process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in International Patent Publication No. WO 96/08520 and U.S. Pat. No. 5,712,352.

Homogeneous, Bulk, or Solution Phase Polymerization

Generally homogeneous solution processes involve polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 200° C., more preferably from about 40° C. to about 180° C., and most preferably from about 60° C. to about 160° C. Polymerization temperature may vary depending on catalyst choice. For example a diamine Ni catalyst may be used at 40° C., while a metallocene Ti catalyst can be used at 100° C. or more. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, isohexane and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the disclosure of U.S. Pat. No. 5,001,205 for general process conditions. See also, International Patent Publication Nos. WO 96/33227 and WO 97/22639.

The invention will now be more particularly described with reference to the following non-limiting Examples. All parts, proportions and percentages are by weight unless otherwise indicated.

Example 1

Synthesis of dimethylanilinium(perfluorophenyl)(triperfluoronaphthyl)borate

Preparation of $[(C_{10}F_7)_3B(C_6F_5)][Li(Et_2O)_{2.5}]$: To a diethyl ether ($Et_2O$) solution of $C_6F_5Br$ (0.320 grams) at −78° C. was added 1 equivalent of nBuLi (0.83 milliliters, 1.6 M, Aldrich, hexane). This solution was stirred for 30 minutes at −78° C. One equivalent of tris(heptafluoronaphth-2-yl)borane was added. The mixture was stirred for 3 hours at −78° C. The cold bath was turned off and the mixture allowed to reach room temperature slowly over 2 hours. The solvent was replaced with hexanes. The hexanes were evaporated. This procedure left a semi-solid, beige material (1.205 grams). The sample was characterized with NMR ($CD_2Cl_2$). The spectra are included. The amount of coordinated $Et_2O$ was quantified by dissolving 0.048 grams of the product and 0.040 grams of toluene in $CD_2Cl_2$. This procedure indicated there were 2.5 equivalents of $Et_2O$.

Preparation of $[(C_{10}F_7)_3B(C_6F_5)][4\text{-}tBu\text{-}Ph\text{-}NMe_2(H)]$: To a solution of $[(C_{10}F_7)_3B(C_6F_5)][Li(Et_2O)_{2.5}]_{in\ CH2}Cl_2$ was added a solution of 4-tBu-Ph-$NMe_2$.HCl. The mixture was stirred for 1 hour at room temperature. The LiCi generated was removed by filtration. The solvent was removed under vacuum. The gummy material was redissolved in a mixture of $CH_2Cl_2$ and hexanes. The mixture was brought to a boil. The solvents were removed under vacuum to leave a beige solid (1.118 grams). The sample was characterized with NMR ($CD_2Cl_2$).

Example 2

Synthesis of dimethylanilinium(diperfluorophenyl)(diperfluoronaphthyl)borate

Preparation of $[(C_{10}F_7)_2B(C_6F_5)_2][Li(Et_2O)_{2.5}]$: To a cold (−78° C.) solution of 2-bromoheptafluoronaphthalene ($BrC_{10}F_7$) in $Et_2O$ was added one equivalent of nBuLi. The reaction mixture was stirred for 3 hours at −78° C. A solution of $ClB(C_6F_5)_2$ (½ equivalent) in $Et_2O$ was added slowly. The mixture was allowed to reach room temperature. The precipitate was removed by filtration. The solvent was replaced with an approximate 1:1 mixture of pentane and hexanes. The hydrocarbon mixture was removed and replaced with pentane (40 milliliters). The product solidified after 18 hours and was collected by filtration to afford 2.455 grams of white powder. The sample was characterized with NMR ($CD_2Cl_2$).

Preparation of $[(C_{10}F_7)_2B(C_6F_5)_2][4\text{-}tBu\text{-}Ph\text{-}NMe_2(H)]$: Solutions of $[(C_{10}F_7)_2B(C_6F_5)_2][Li(Et_2O)_{2.5}]$ (2.406 grams) and 4-tBu-Ph-NMe$_2$.HCl (1 equivalent) in $CH_2Cl_2$ were combined at room temperature. The mixture was stirred for 1.5 hours. The solid precipitate was removed by filtration. The solvent was replaced with pentane. The product solidified after 18 hours and was collected by filtration to afford 2.353 grams of white powder. The sample was characterized with NMR ($CD_2Cl_2$).

Example 3

Synthesis of dimethylanilinium(triperfluorophenyl) (perfluoronaphthyl)borate

Preparation of $[(C_{10}F_7)B(C_6F_5)_3][Li(Et_2O)_{2.5}]$: This compound was prepared using the procedure outlined above for making $[(C_{10}F_7)_3B(C_6F_5)][Li(Et_2O)_{2.5}]$.

Preparation of $[(C_{10}F_7)B(C_6F_5)_3][PhNMe_2(H)]$: This compound was prepared using the procedure outlined above for making $[(C_{10}F_7)_3B(C_6F_5)][4\text{-}tBu\text{-}Ph\text{-}NMe_2(H)]$.

Polymerization Examples 4 to 7

$\mu$-Me$_2$Si(Indenyl)$_2$HfMe$_2$ (38.7 mg, 0.0782 mmole), hereafter referred to as Catalyst A, was preactivated with the dimethylanilinium(perfluorophenyl)(triperfluoronaphthyl) borate (85.0 mg, 0.0762 mmole) of Example 1 in toluene (450 mL) under an inert atmosphere. This mixture was allowed to activate until the evolution of methane stopped (5-10 min.) and then sealed for transfer to the delivery vessel. The catalyst solution was then used to effect homogeneous solution polymerization of propylene/ethylene.

A mixture of hexanes (5.4 L/h) was pumped into a 1 liter, liquid filled, stirred tank reactor while the temperature was equilibrated at 70° C. using a steam/water mixture flowing through the reactor jacket. The preactivated Catalyst A in toluene (0.060 L/h, 0.0104 mmole/h) and a scavenger solution of tri n-octyl aluminum in hexane (0.090 L/h, 0.3202 mmole/h) were then pumped to the reactor for 20 min before monomers were introduced. Propylene (1.487 L/h, 19.14 mole/h) was pumped to the reactor as a liquid. Ethylene was delivered as a gas solubilized in the chilled solvent in a controlled fashion through a mass flow meter/controller (60.0 g/h, 2.14 mole/h). Continuous flow was established at a constant temperature and stirring. Onset of polymerization activity was determined by an observation of a viscous product. Once activity was established, one hour was provided to establish equilibrium. The resulting mixture, containing mostly solvent, polymer (8.63 wt %), and unreacted monomers was collected (10 min.) in a can containing some alcohol to end the polymerization activity. A stabilizer was added to the polymer solution and mixed. The solvent was evaporated on a steam bath and the product dried under vacuum at 90° C. for 16 h. The resulting solid (35 g) showed 16.67 wt % ethylene by Fourier Transformation Infrared analysis (FTIR) (within the parameters set by ASTM D-3900), a melt flow rate (MFR) @230° C. of 6.4, a weight average molecular weight of 213,770 Daltons and a molecular weight distribution (MWD, $M_w/M_n$) 2.32. Gel Permeation Chromatography (GPC) with Malls/3D detector was used for determining the weight average molecular weight and a diffractive index detector (DRI) was used to calculate the MWD.

The above activation and polymerization process was repeated but with the Catalyst A being activated in Example 5 with the dimethylanilinium(diperfluorophenyl)(diperfluoronaphthyl)borate of Example 2 and in Example 6 with the dimethylanilinium(triperfluorophenyl)(perfluoronaphthyl) borate of Example 3. In Example 7, Catalyst A was preactivated with dimethylanilinium(tetrakisperfluoronaphthyl)borate.

Figure 1:
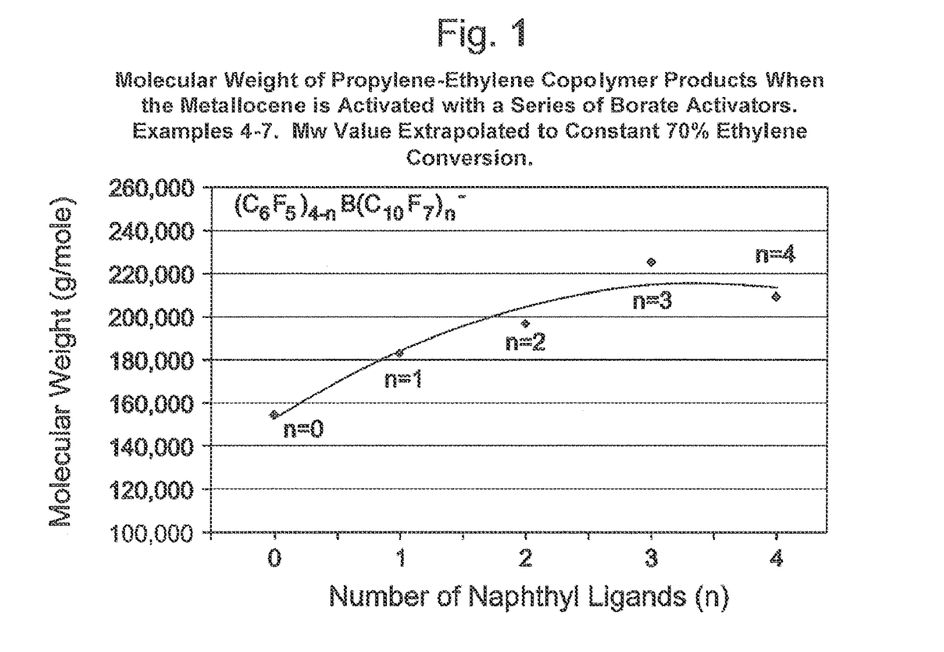
FIG. 1 is a graph of copolymer molecular weight versus the number, n, of perfluoronaphthyl ($C_{10}F_7$) ligands on an activator anion having the formula $(C_6F_5)_{4-n}(C_{10}F_7)_n^-$ for the ethylene/propylene polymerization runs of Examples 4 to 7 using a precatalyst comprising μ-dimethylsilyl(bis-indenyl) hafnium dimethyl (Catalyst A) and the activator $Ct^+(C_6F_5)_{4-n}(C_{10}F_7)_n^-$ where $Ct^+$ is the dimethylanilinium cation.

The molecular weight of the copolymers obtained in the polymerization processes of Examples 4 to 7 are plotted against the number of perfluoronaphthyl ligands on the activator in FIG. 1, which also includes the measured molecular weight for a copolymer produced from Catalyst A preactivated with dimethylanilinium(tetrakisperfluorophenyl)borate. From FIG. 1 it will be seen that each of the activators of Examples 1 to 3 gave copolymers with higher molecular weight than that measured for the copolymer obtained with the (tetrakisperfluorophenyl)borate activator (n=0), with the activator of Example 1 (n=3) giving the highest molecular weight approaching and in one case even surpassing that obtained with the (tetrakisperfluoronaphthyl)borate of Example 7 (n=4).

Figure 2:
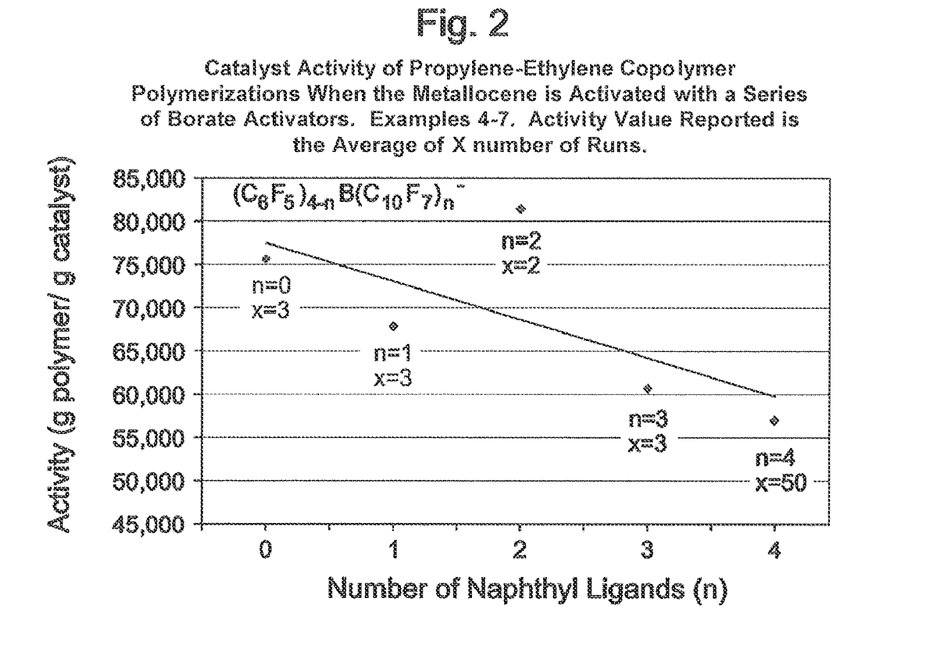
FIG. 2 is a graph comparing the activity of the polymerization catalyst A, averaged over x number of runs, with the number, n, of perfluoronaphthyl ($C_{10}F_7$) ligands on the activator $Ct^+(C_6F_5)_{4-n}(C_{10}F_7)_n^-$ for the ethylene/propylene polymerization runs of Examples 4 to 7.

The activity of Catalyst A, averaged over x number of runs, in the polymerization processes of Examples 4 to 7 is plotted against the number of perfluoronaphthyl ligands on the activator in FIG. 2, which also includes the measured activity of Catalyst A preactivated with dimethylanilinium(tetrakisperfluorophenyl)borate. FIG. 2 shows that the asymmetrical activators have improved activity over the n=4 activator.

Polymerization Examples 8 to 17

Examples 8 to 17 were part of a high-throughput experiment in which each reaction was replicated four times. In general, results reported as the average value of the four runs.

Ethylene-alpha-olefin co-polymerizations were performed in a glass-lined 5-milliliter autoclave reactor equipped with a mechanical stirrer, an external heater for temperature control, a septum inlet and a regulated supply of dry nitrogen and ethylene in an inert atmosphere (nitrogen) glove box. The reactor was dried and degassed thoroughly at 115° C. The diluent, comonomer, and scavenger, were added at room temperature and atmospheric pressure. The reactor was then brought to process pressure and charged with ethylene while stirring at 800 RPM. The activator and catalyst were added via syringe with the reactor at process conditions (80° C./75 psi (517 kPa)). Examples 8-12 used a catalyst comprising $\mu$-dimethylsilyl(bis-indenyl)hafnium dimethyl (Catalyst A) and Examples 13-17 used a catalyst comprising bis(1-methyl-3-butylcyclopentadienyl)zirconium dimethyl, (Catalyst B), each catalyst being activated with different activators of the formula $Ct^+(C_6F_5)_{4-n}(C_{10}F_7)_n^-$ where $Ct^+$ is the dimethylanilinium cation and n=0 to 4.

The polymerization was continued while maintaining the reaction vessel within 3° C. of the target process temperature (80° C.) and 5 psi (34 kPa) of target process pressure (75 psi (517 kPa)) (by automatic addition of ethylene on demand) until a fixed uptake of ethylene was noted (corresponding to about 0.15 g polymer) or until a maximum reaction time of 20 minutes had passed. The reaction was stopped by pressurizing the reactor to 30 psi (207 kPa) above the target process pressure with a gas mixture composed of 5 mol % oxygen in argon. The polymer was recovered by vacuum centrifugation of the reaction mixture. Bulk polymerization activity was calculated by dividing the yield of polymer by the total weight of the catalyst charge by the time in hours and by the absolute monomer pressure in atmospheres. The specific polymerization activity was calculated by dividing the yield of polymer by the total number of millimoles of transition metal contained in the catalyst charge by the time in hours and by the absolute monomer pressure in atmospheres.

Figure 3:
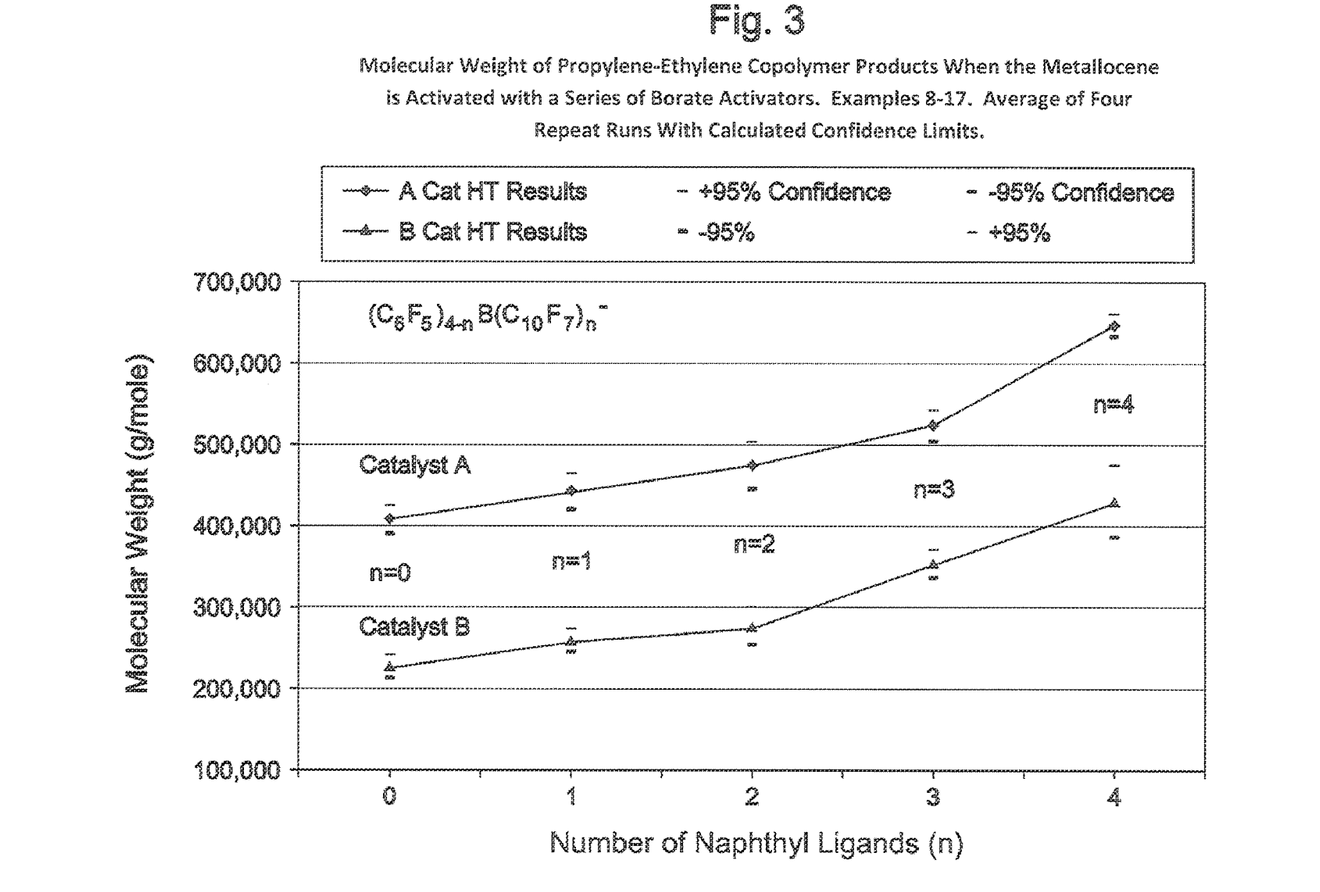
FIG. 3 is a graph of copolymer molecular weight versus the number, n, of perfluoronaphthyl ($C_{10}F_7$) ligands on an activator anion having the formula $(C_6F_5)_{4-n}(C_{10}F_7)_n^-$ for the ethylene/propylene polymerization runs of Examples 8 to 17.

The results are shown in FIG. 3, which shows that the improvement in molecular weight obtained with the n=1, 2 and 3 activators versus the n=0 activator are obtained with both Catalysts A and B.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby.

What we claim is:

1. A process for adjusting the molecular weight of a propylene-ethylene copolymer, said process comprising:

contacting in a homogeneous solution process propylene and ethylene with a catalyst system comprising: (a) dimethylsilylbisindenyl hafnium dimethyl; and (b) an activator comprising a fluoroarylborate anion represented by the formula:

where $Ct^+$ is a cation capable of extracting an alkyl group from, or breaking a carbon-metal bond of, the organometallic compound; Ar is a fluorophenyl group; R is a fluoronaphthyl group and each of x and n is 0, 1, 2, or 3, with the proviso that the sum of x+n=4, and wherein said propylene-ethylene copolymer contains units derived from propylene in an amount greater than or equal to 65 weight percent and units derived from ethylene in an amount of from 5 to 35 weight percent; and adjusting the molecular weight of the propylene-ethylene copolymer from about 140,000 g/mole to about 550,000 g/mole by changing the n of the activator between 0, 1, 2, and 3, as when the lowest molecular weight propylene copolymer is desired, n=0 and the activator having n=0 is contacted with the metallocene, and when the highest molecular weight is desired, n=3 and the activator having n=3 is contacted with the metallocene.

2. The process of claim 1 wherein Ar is a perfluorophenyl.

3. The process of claim 1 wherein R is a perfluoronaphthyl.

4. The process of claim 1 wherein the activator comprises at least one of the anions:

5. A process for adjusting the molecular weight of a propylene-ethylene copolymer, said process comprising:

contacting in a homogeneous solution process propylene and ethylene with a catalyst system comprising: (a) bis(1-methyl-3-butylcyclopentadienyl)zirconium dimethyl and (b) an activator comprising a fluoroarylborate anion represented by the formula:

where $Ct^+$ is a cation capable of extracting an alkyl group from, or breaking a carbon-metal bond of, the organometallic compound; Ar is a fluorophenyl group; R is a fluoronaphthyl group and each of x and n is 0, 1, 2, or 3, with the proviso that the sum of x+n=4, and wherein said propylene-ethylene copolymer contains units derived from propylene in an amount greater than or equal to 65 weight percent and units derived from ethylene in an amount of from 5 to 35 weight percent; and adjusting the molecular weight of the propylene-ethylene copolymer from about 140,000 g/mole to about 550,000 g/mole by changing the n of the activator between 0, 1, 2, and 3, as when the lowest molecular weight propylene copolymer is desired, n=0 and the activator having n=0 is contacted with the metallocene, and when the highest molecular weight is desired, n=3 and the activator having n=3 is contacted with the metallocene.

6. The process of claim 5 wherein Ar is a perfluorophenyl.

7. The process of claim 5 wherein R is a perfluoronaphthyl.

8. The process of claim 5 wherein the activator comprises at least one of the anions:

-continued

9. The process of claim 5 wherein $Ct^+$ is selected from silylium, trityl carbenium, Group-12 metals, anilinium, ammonium, phosphonium, and arsonium cations, and anilinium, ammonium, phosphonium, and arsonium cationic derivatives wherein the cationic derivatives contain $C_1$ to $C_{30}$ hydrocarbyl, hydrocarbylsilyl, or hydrocarbyl-amine substituents for one or more cation hydrogen atoms.

10. A process for adjusting the molecular weight of a propylene-ethylene copolymer, said process comprising:
contacting in a homogeneous solution process propylene and ethylene with a catalyst system comprising: (a) dimethylsilylbisindenyl hafnium dimethyl or bis(1-methyl-3-butylcyclopentadienyl)zirconium dimethyl and (b) an activator comprising a fluoroarylborate anion represented by the formula:

wherein $Ct^+$ is selected from the group consisting of: silylium, trityl carbenium, Group-12 metals, anilinium, ammonium, phosphonium, and arsonium cations, and anilinium, ammonium, phosphonium, and arsonium cationic derivatives wherein the cationic derivatives contain $C_1$ to $C_{30}$ hydrocarbyl, hydrocarbylsilyl, and hydrocarbyl-amine substituents for one or more cation hydrogen atoms; Ar is a fluorophenyl group; R is a fluoronaphthyl group and each of x and n is 0, 1, 2, or 3, with the proviso that the sum of x+n=4, and wherein said propylene-ethylene copolymer contains units derived from propylene in an amount greater than or equal to 65 weight percent and units derived from ethylene in an amount of from 5 to 35 weight percent; and
adjusting the molecular weight of the propylene-ethylene copolymer from about 140,000 g/mole to about 550,000 g/mole by changing the n of the activator between 0, 1, 2, and 3, as when the lowest molecular weight propylene copolymer is desired, n=0 and the activator having n=0 is contacted with the metallocene, and when the highest molecular weight is desired, n=3 and the activator having n=3 is contacted with the metallocene.

11. The process of claim 5 wherein Ar is a perfluorophenyl.

12. The process of claim 5 wherein R is a perfluoronaphthyl.

13. The process of claim 5 wherein the activator comprises at least one of the anions:

* * * * *